US012651597B2

(12) United States Patent
Yedidia et al.

(10) Patent No.: US 12,651,597 B2
(45) Date of Patent: Jun. 9, 2026

(54) NATURAL LANGUAGE INTERFACES

(71) Applicant: Analog Devices, Inc., Wilmington, MA (US)

(72) Inventors: Jonathan Samuel Yedidia, Cambridge, MA (US); Daniel Schmidt, Somerville, MA (US); Cristobal Alessandri, Boston, MA (US); Reuben Harry Cohn-Gordon, Cambridge, MA (US); Ilker Bayram, Brookline, MA (US); Ravi Kiran Raman, Cambridge, MA (US); Nicholas Eastman Moran, Cambridge, MA (US); Atulya Yellepeddi, Medford, MA (US); Milutin Pajovic, Cambridge, MA (US); Sunrita Poddar, Jamaica Plain, MA (US)

(73) Assignee: Analog Devices, Inc., Wilmington, MA (US)

( * ) Notice: Subject to any disclaimer, the term of this patent is extended or adjusted under 35 U.S.C. 154(b) by 268 days.

(21) Appl. No.: 17/825,288

(22) Filed: May 26, 2022

(65) Prior Publication Data

US 2022/0383868 A1 Dec. 1, 2022

Related U.S. Application Data

(60) Provisional application No. 63/195,157, filed on May 31, 2021.

(51) Int. Cl.
*G10L 15/193* (2013.01)
*G10L 15/26* (2006.01)

(52) U.S. Cl.
CPC ............ *G10L 15/193* (2013.01); *G10L 15/26* (2013.01)

(58) Field of Classification Search
CPC . G10L 15/193; G10L 15/26; G10L 2015/228; G10L 15/22; G06F 40/253
See application file for complete search history.

(56) References Cited

U.S. PATENT DOCUMENTS

| | | | |
|---|---|---|---|
| 5,083,268 A * | 1/1992 | Hemphill .............. | G06F 40/253 |
| | | | 704/9 |
| 5,710,864 A | 1/1998 | Juang et al. | |
| 10,559,299 B1 * | 2/2020 | Arel ......................... | G06N 7/01 |
| 2006/0085183 A1 | 4/2006 | Jain | |
| 2008/0243484 A1 * | 10/2008 | Mohri ................... | G10L 15/193 |
| | | | 704/4 |
| 2008/0270129 A1 * | 10/2008 | Colibro ................... | G10L 15/19 |
| | | | 704/E15.005 |
| 2008/0294619 A1 * | 11/2008 | Hamilton, II ....... | G06F 16/3326 |
| | | | 707/999.005 |
| 2012/0072221 A1 | 3/2012 | White et al. | |

(Continued)

*Primary Examiner* — Darioush Agahi
(74) *Attorney, Agent, or Firm* — ArentFox Schiff LLP

(57) ABSTRACT

It is not trivial to implement speech and natural language processing in offline embedded systems. Voice control of devices in various settings and applications can benefit from an embedded speech and natural language processing solution. One feature that helps to correct automatic speech recognition outputs is grammar projection. Another feature addresses situations where there is imperfect information or incomplete information by providing an application programming interface to enable structured queries and responses between an interpreter and an application.

17 Claims, 7 Drawing Sheets

(56)        References Cited

U.S. PATENT DOCUMENTS

| | | | |
|---|---|---|---|
| 2013/0152092 A1* | 6/2013 | Yadgar | G10L 15/1822 |
| | | | 718/102 |
| 2013/0238326 A1 | 9/2013 | Kim et al. | |
| 2014/0303973 A1* | 10/2014 | Amarilli | G10L 15/08 |
| | | | 704/235 |
| 2015/0287411 A1 | 10/2015 | Kojima et al. | |
| 2017/0329841 A1* | 11/2017 | Holmes | G06F 16/3343 |
| 2018/0254035 A1* | 9/2018 | Kulkarni | G10L 15/02 |
| 2018/0342237 A1 | 11/2018 | Lee et al. | |
| 2019/0090056 A1 | 3/2019 | Rexach et al. | |
| 2019/0355354 A1 | 11/2019 | Geng | |
| 2020/0005777 A1 | 1/2020 | Wittke | |
| 2020/0160863 A1 | 5/2020 | Lee et al. | |
| 2021/0027785 A1* | 1/2021 | Kahan | G06F 16/433 |
| 2021/0125609 A1 | 4/2021 | Dusan et al. | |
| 2021/0127004 A1 | 4/2021 | Caron et al. | |
| 2021/0151057 A1 | 5/2021 | Sinha et al. | |
| 2021/0166680 A1 | 6/2021 | Jung et al. | |
| 2021/0225408 A1 | 7/2021 | Dong | |
| 2021/0327431 A1* | 10/2021 | Stewart | G06V 40/45 |
| 2021/0397787 A1* | 12/2021 | Nagvenkar | G06N 3/04 |
| 2022/0036893 A1* | 2/2022 | Gandhe | G10L 15/065 |
| 2022/0139377 A1 | 5/2022 | Lee et al. | |
| 2022/0284174 A1* | 9/2022 | Galitsky | G06F 40/30 |
| 2022/0335953 A1 | 10/2022 | Rikhye et al. | |
| 2023/0017927 A1 | 1/2023 | Roh et al. | |
| 2023/0395087 A1 | 12/2023 | Tagliasacchi et al. | |

* cited by examiner

Figure 2:
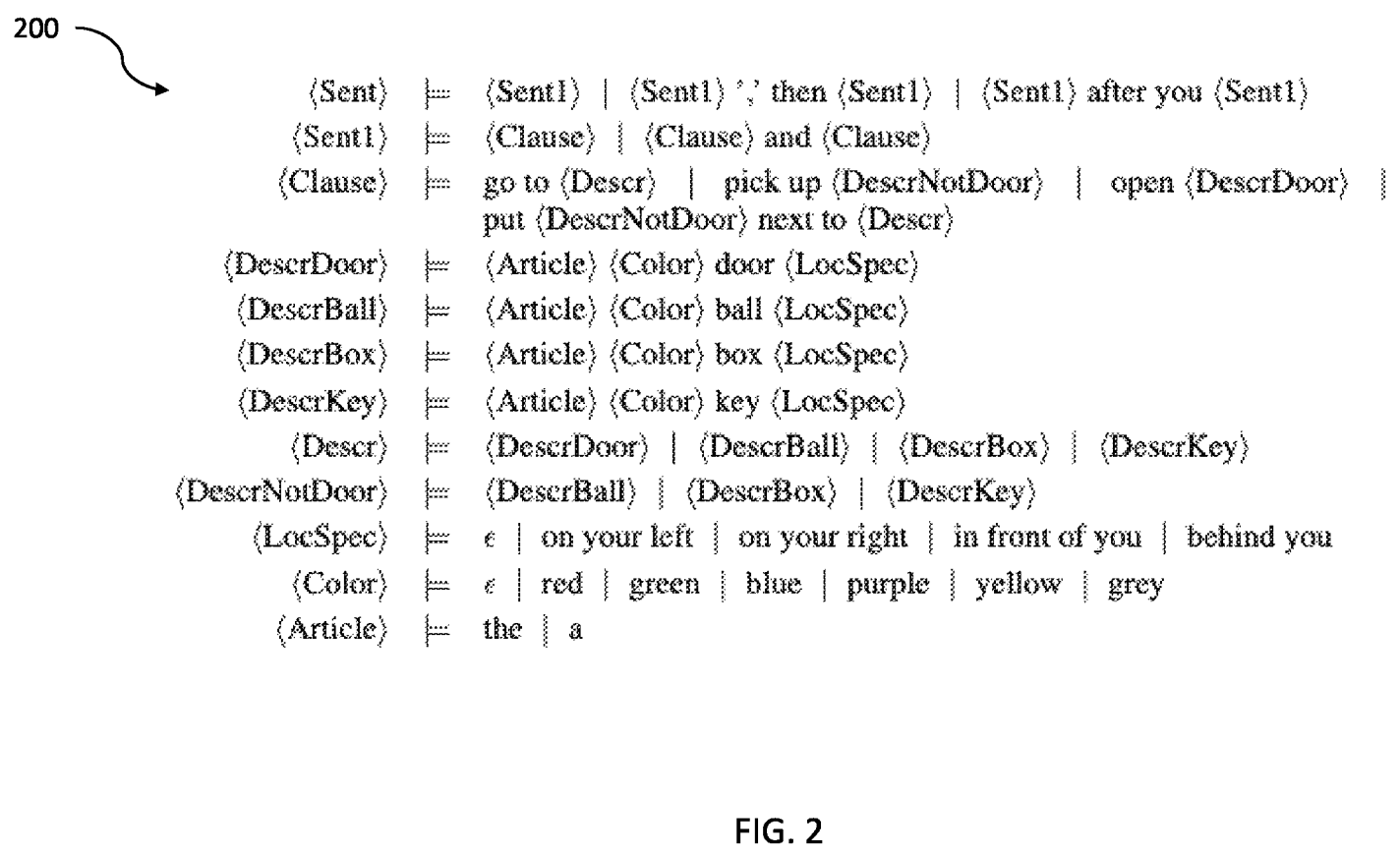

⟨Sent⟩ ::= ⟨Sent1⟩ | ⟨Sent1⟩ ", then" ⟨Sent1⟩ | ⟨Sent1⟩ "after you" ⟨Sent1⟩

⟨Sent1⟩ ::= ⟨Clause⟩ | ⟨Clause⟩ "and" ⟨Clause⟩

⟨Clause⟩ ::= "go to" ⟨Descr⟩ | "pick up" ⟨DescrNotDoor⟩ | "open" ⟨DescrDoor⟩ | "put" ⟨DescrNotDoor⟩ "next to" ⟨Descr⟩

⟨DescrDoor⟩ ::= ⟨Article⟩ ⟨Color⟩ "door" ⟨LocSpec⟩

⟨DescrBall⟩ ::= ⟨Article⟩ ⟨Color⟩ "ball" ⟨LocSpec⟩

⟨DescrBox⟩ ::= ⟨Article⟩ ⟨Color⟩ "box" ⟨LocSpec⟩

⟨DescrKey⟩ ::= ⟨Article⟩ ⟨Color⟩ "key" ⟨LocSpec⟩

⟨Descr⟩ ::= ⟨DescrDoor⟩ | ⟨DescrBall⟩ | ⟨DescrBox⟩ | ⟨DescrKey⟩

⟨DescrNotDoor⟩ ::= ⟨DescrBall⟩ | ⟨DescrBox⟩ | ⟨DescrKey⟩

⟨LocSpec⟩ ::= ε | "on your left" | "on your right" | "in front of you" | "behind you"

⟨Color⟩ ::= ε | "red" | "green" | "blue" | "purple" | "yellow" | "grey"

⟨Article⟩ ::= "the" | "a"

NATURAL LANGUAGE INTERFACES

CROSS-REFERENCE TO RELATED APPLICATION

This application claims the benefit of and priority to U.S. patent application Ser. No. 63/195,157, filed May 31, 2021, entitled "NATURAL LANGUAGE INTERFACES," which is incorporated herein by reference in its entirety.

FIELD OF THE DISCLOSURE

The present invention relates to the field of artificial intelligence, in particular to natural language processing for embedded systems.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2 is an example specification grammar for use in grammar projection in a natural language processing system in accordance with features of embodiments described herein;

FIG. 3 is an example data set of sentences in connection with the example specification grammar of FIG. 2, for use in grammar projection in a natural language processing system in accordance with features of embodiments described herein;

DETAILED DESCRIPTION OF EXAMPLE EMBODIMENTS

Figure 1:
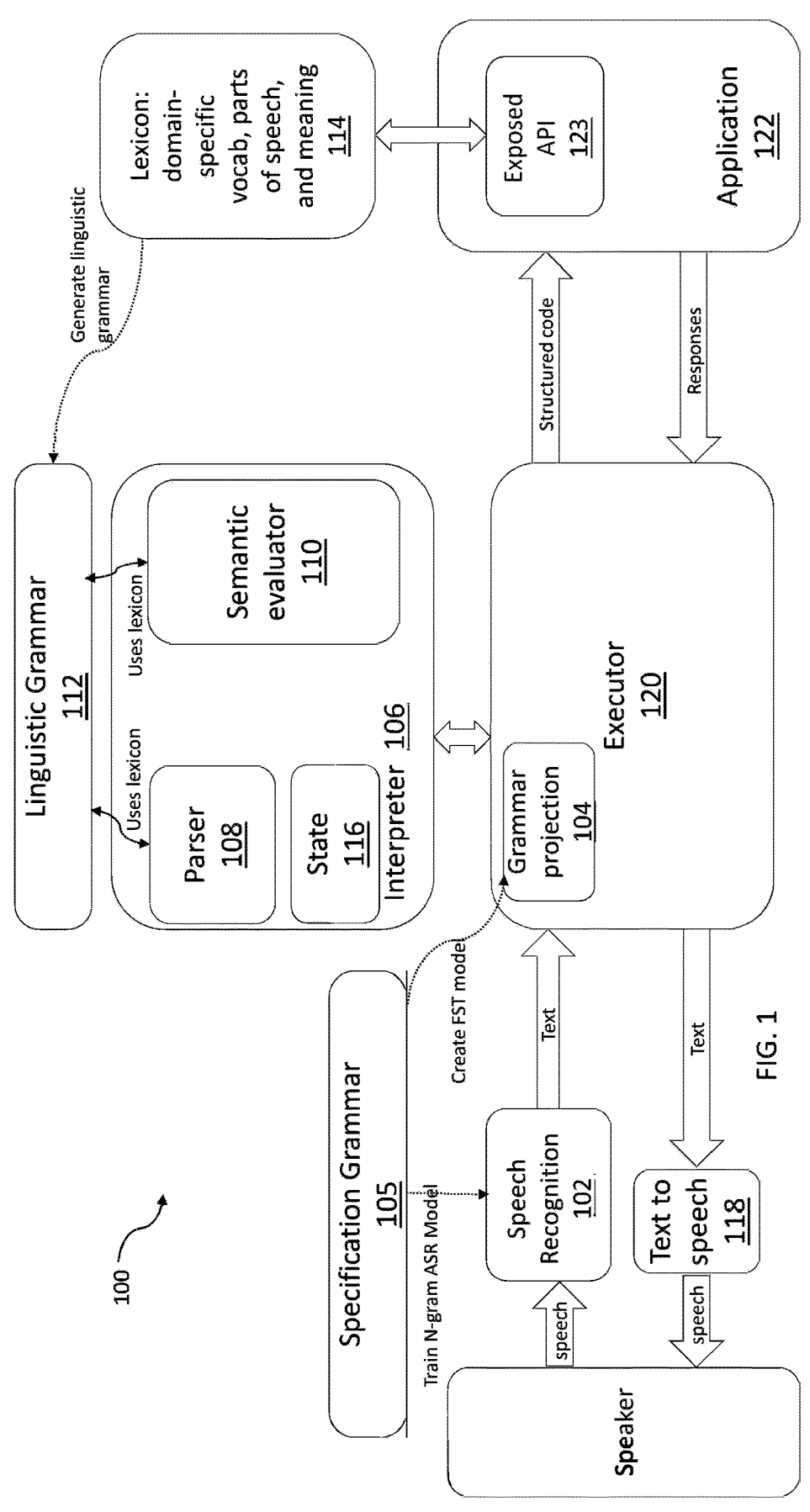
FIG. 1 is a simplified block diagram of a natural language processing system in accordance with features of embodiments described herein.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. When used herein, the notation "A/B/C" means (A), (B), and/or (C).

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The disclosure may use perspective-based descriptions such as "above," "below," "top," "bottom," and "side;" such descriptions are used to facilitate the discussion and are not intended to restrict the application of disclosed embodiments. The accompanying drawings are not necessarily drawn to scale. Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

In the following detailed description, reference is made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Understanding sentences or phrases (hereinafter collectively referred to as "sentences") using speech and natural language processing can greatly benefit voice-based user interfaces. In many situations, it is inconvenient or impractical to interact with electronic devices with our hands. Voice-based user interfaces have become more popular with many electronic devices as cloud-based speech recognition and processing systems become more robust and viable. Many electronic systems can listen in the background and activate upon recognition of a "wakeword" uttered by a user. Additionally, some electronic systems can interpret a finite set of voice commands, such as "tell me a joke."

Formal semantics offers one approach for computing the meaning of declarative sentences, and there have been computational systems built to exploit this framework. In formal semantics, the meaning of a sentence is computed by parsing and evaluating its parts, and then evaluating the composition of the meaning of the parts, similar to how mathematical expressions are evaluated in programming language interpreters.

However, some shortcomings of the formal semantics approach make it difficult to embed speech and natural language processing in certain systems.

Overview

It is not trivial to implement speech and natural language processing in offline embedded systems. Voice control of devices in various settings and applications can benefit from an embedded speech and natural language processing solution. One feature that helps to correct automatic speech recognition outputs is grammar projection. Another feature addresses situations in which there is imperfect information or incomplete information by providing an application programming interface (API) to enable structured queries and responses between an interpreter and an application.

As an example, consider a system designed to evaluate English sentences about chess positions. Note first that the semantic evaluation of a sentence normally depends on the state of the world. For example, if a system is asked a question like "does the white bishop pin a knight?," the evaluation of the correct answer would depend on the actual chess position. The formal semantics approach can compute accurate, precise, and reliable answers to questions and commands. In general, the vocabulary and meaning of particular words should be defined depending on the domain; for example, "bishop" has a specific meaning in the chess domain.

One system can implement a "template-based" voice commands approach, where a set of English sentences representing commonly used commands is represented, including the possibility of variables to fill in in different spots in the sentence. Such a system relies upon having complete information of the world to perform interpretation. Also, because it is not compositional, it is difficult to scale beyond a set of simple commands.

Attempts to train neural networks to replace formal syntax and semantics to compute the meaning of sentences have been largely unsuccessful. Also, such systems do not have capabilities to address situations where there is incomplete or imperfect information.

The present disclosure describes a compositional and precise speech and natural language understanding system targeting inexpensive offline embedded systems. The goal is to allow people to communicate with embedded devices, without any Internet connection, using natural language. Users can ask questions or give commands about some domain that the device "understands" in the sense that the device can compute appropriate responses to queries or commands about that domain. Potential applications include voice or text communication with automobiles, aircraft, appliances, toys, computer or video games, robots, drones, cameras, database systems, medical devices, and graphical user interfaces. An embedded, integrated system that is implemented in the device is beneficial in situations where a device may not have access to the Internet or cannot rely on a stable Internet connection.

The system leverages the restriction of the vocabulary and grammar for any particular system to a well-defined subset of a natural language like English, appropriate for the domain. While restricting in this way means that one can only communicate according to a predefined grammar, the predefined grammar can nevertheless allow for a precise communication of a wide range of possible sentences; in fact, a potentially infinite number of sentences about the domain of interest. The predefined vocabulary and grammar also allow for much improved speech recognition, even under noisy conditions.

One feature of embodiments described herein is a grammar-grounded "projection" algorithm for improved speech recognition, details of which are described in greater detail below. In general, the grammar projection algorithm takes as input an arbitrary sentence and finds a similar-sounding sentence in a (possibly infinite) set of sentences (defined by a context free specification grammar). The speech may contain unexpected words, repetitions or mispronounced words, and the ASR system may introduce errors, so the output of the Automatic Speech Recognition (ASR) may not be otherwise parseable without the grammar projection algorithm.

As will be described in detail below, the grammar projection algorithm computes a "phonetic distance" between the input sentence and the closest sentence in a domain-specific specification grammar, producing a projected sentence and a distance score. As a result, an ASR can be connected to a language interpretation system that expects a clean, parseable text input. The projected sentence effectively "denoises" the ASR output by correcting for mispronounced words, filler words, etc.

A wakeword-less or keyword-less assistant may be achieved by using the "phonetic distance score;" an always-on system can discriminate between valid commands and background conversation based on the phonetic distance score computed for an input.

Another feature of embodiments described herein is a compositional language interface with interactive semantic evaluation, details of which are described in detail below.

Example Speech and Natural Language Processing System

As illustrated in FIG. 1, a speech and natural language processing system 100 for implementing embodiments described herein may include multiple modular sub-systems that each serve a particular purpose and communicate with each other. The system 100 comprises a natural language processing system to communicate with an application using natural sentences. As shown in FIG. 1, the system 100 includes an automatic speech recognition (ASR module) 102 and a grammar projection module 104, both of which interact with a specification grammar 105 as will be described. The system 100 further includes an interpreter 106 including a parser 108 and a semantic evaluator 110, both of which interact with a linguistic grammar 112 generated by a lexicon 114, as well as a state 116. The system 100 further includes a text-to-speech module 118, and an executor module 120 that interacts with an application 122 via an API 123 to execute action in the world. The executor module 120 may include further submodules, such as a planner, a controller, and a memory. Lexicon 114 may include definitions for every word relevant to the domain (e.g., box, green), such as nouns, verbs, adverbs, adjectives, etc. Planner can plan a sequence of actions. Memory can keep track of what has been seen or what is known. Controller can assist the planner and interface with a graphical user interface (GUI) or some other suitable world.

One implementation leverages the restricted vocabulary and grammar for a particular domain, as defined by specification grammar 105, to provide enhanced ASR using the grammar projection algorithm implemented by the grammar projection module 104 as described in greater detail below. In certain embodiments, the domain may be an infotainment control system for an automobile. For purposes of example herein, the domain may be a BabyAI domain, as described in the paper "BabyAI, A Platform to Study the Sample Efficiency of Grounded Language Learning," by Chevalier-Boisvert et al., in ICLR 2019. The grammar projection algorithm also allows for wakewordless or keywordless operation because the system 100 can determine for itself whether a sentence is intended for/addressed to the system.

In certain embodiments, the system 100 utilizes a "compositional" language interface. In other words, once a word is defined in the lexicon 114, it can be used in any sentence that is acceptable in the grammar. For example, "bishop" would be given a definition in the lexicon, and then any sentence that used the word "bishop" would refer to that definition as part of the computation of the overall meaning of the sentence.

Extending compositional formal semantics, the system 100 allows for interactive semantic evaluation by the semantic evaluator 110, which involves providing an application programming interface (API) between the interpreter 106 and the application 122. Interactive semantic evaluation can handle situations in which a query or command is made for which the system may have incomplete information. At a high level, the semantic evaluator 110 can interact with the application 112 to resolve the meaning of parts of a sentence by querying for information, requesting function evaluations, or triggering routines. Semantic evaluation may use several back-and-forth queries and routine executions to compute the meaning of a sentence.

The grammar projection method described herein offers wakeword-less or keyword-less operation. Grammar projection can handle "filler" noises ("Um", "eh", etc.). Such an approach to find the path with a least distance from the lexicon has not been used for projecting a voice utterance to a sentence based on a context-free grammar lexicon.

As used herein, linguistic grammar 112 uses categories like Noun, Verb, Adjective, Determiner, Noun Phrase, with rules about how they combine. In short, linguistic grammar 112 computes meaning and is primarily domain-agnostic (other than the lexicon 114, which defines domain-specific vocabulary for use by the linguistic grammar 112). Specification grammar 105 identifies domain-specific sentences that are handled/understood by the system 100. It is conceivable that one "unified" grammar serves as both a linguistic grammar 112 and as a specification grammar 105, but this is not necessary.

As an example, in the context of natural language control system for an automobile, a command such as "close the temperature" may be acceptable with regard to the linguistic grammar 112 because it follows the rules of grammar (transitive verb-article-noun); however, it would likely not be acceptable with regard to the specification grammar 105 because it specifies an inexecutable (or meaningless) command. On the other hand, "close the window" would likely be acceptable with regard to both the linguistic grammar 112 and the specification grammar 105 because it is both grammatically correct and corresponds to a meaningful and executable command.

In the system 100, the ASR 102 may use N-gram word models to implement a simple statistical approach that gathers statistics of what word is likely to follow after N previous words. For example, in an automotive domain, the word "windows" or "doors" is statistically highly likely to follow the N=3 words "close all the." Given even a large data set, this model takes a short time (on the order of seconds) to train, and only a few megabytes of memory to store. Additionally, this approach reduces the error rate of ASR significantly.

The specification grammar 105 is easy to convert to "small" automata comprising finite state transducers (FSTs) used in grammar projection. In particular, grammar projection uses FSTs to force system input (text or spoken) into the phonetically nearest form defined in the specification grammar 105. FSTs can be created from specification grammars in a few seconds, require relatively little (e.g., less than 200K) memory for storage, and can be used to project into an acceptable form very quickly (e.g., within milliseconds) using word-to-word or phoneme-to phoneme projection). The likely pronunciations of domain-specific words can be obtained from a phoneme dictionary or may be precomputed using a neural network, with developers being allowed to correct them.

Figure 4:
FIG. 4 is a portion of a finite-state transducer (FST) in connection with the example specification grammar of FIG. 2, for use in grammar projection in a natural language processing system in accordance with features of embodiments described herein.

FIG. 2 illustrates an example specification grammar (for the BabyAI domain) 200 for use in the system 100 in accordance with features of embodiments described herein. FIG. 3 is a portion of an example data set 300 of sentences generated from the example specification grammar of FIG. 2. FIG. 4 is a portion of an FST 400 created from the example specification grammar of FIG. 2, for use in grammar projection in accordance with features of embodiments described herein;

Referring again to FIG. 1, interactive semantic evaluation enables the system 100 to handle incomplete information and seek clarification when necessary. Also, interactive semantic evaluation allows a user to ask questions and the system can handle answering questions.

Interpreter 106 may interpret a sentence and translate the sentence into a message. A message can be a mission, which asks for an action to be performed. Semantic evaluator 110 can evaluate local information and send a message to obtain information the semantic evaluation does not have. For example, a message can be a query, which requests or asks for information. The message, e.g., including a mission and/or query, is sent to the application.

For example, a system may be asked to "open the green door" even when it does not see any green door, and in this situation semantic evaluator can trigger an "Explore" routine, after which the list of seen entities is updated, and if it includes a green door, the semantic evaluator will trigger an "Open Door" routine. This interactive semantic evaluation allows the system to work in situations where there is incomplete information, or simply when the human user gives an incomplete command for which clarification is necessary.

The system 100 interprets sentences compositionally based on the semantic evaluation of its parts, where the semantic evaluation of its parts by the semantic evaluator 110 may involve an iterative process of sending structured code or data to the application 122 and receiving structured responses. The structured code or data may include querying information from the application, sending information to the application, and the execution of functions or routines from the application. The language interpreter 106 may produce a text response, which may be provided to the text-to-speech module 118. The text input from the ASR 102 may be in the form of a command (requesting action), a question (requesting information), or a declarative sentence (sending information).

The interpreter 106 may include a domain-agnostic language engine and a domain-specific configuration. The domain-specific configuration may define the vocabulary and the meaning associated to the vocabulary. The meaning associated to the vocabulary may include function evaluations and routines from the application.

The evaluation of a sentence may involve a request for clarification from the user if the compositional evaluation of the sentence's parts is not uniquely determined. The interpreter 106 may resolve referential expressions based on prior interactions.

As will be described in greater detail below, the grammar projection algorithm computes a phonetic distance between an input sentence and the closest valid sentence in the domain-specific grammar specification. The grammar projection algorithm outputs the closest sentence and may also output a phonetic distance score. The phonetic score is used to accept or reject sentences based on the distance between the original sentence and the projected sentence.

The lexicon 114 is locally available, and every word is defined for the target application/domain. Using the lexicon as such can provide precise communication, which may be beneficial for systems that cannot tolerate imprecise user interactions. Additionally, other imprecise systems can be too computationally heavy for a given application.

The system 100 is highly interpretable because it is structured. Incorrect responses can be identified easily and clearly.

Allowing for interaction with the world means that the world can change and no longer need to be fixed. Such a feature offers portability and scalability, making the system solution highly flexible.

The domain-specific ASR described herein is highly accurate; even with high noise (SNR=5), the Word Error Rate is much lower than the 7% typical of a state-of-the-art wide-vocabulary ASR in clean conditions and is resilient with respect to strong accents. Overall system latency is very low and dominated by that of ASR. Most of the compute load is the ASR. Semantics are programmable in arbitrary ways; e.g., "cool down to 10 Celsius" turns off the heater if it is on, turns on the AC if it isn't on, and decreases the AC setting to 10 Celsius. The semantics engine easily computes meaning of sentences like "If the AC is on, close all the open windows," which will confuse a neural network or statistical approach.

The approach described herein successively computes meanings up the syntax tree. For example, in the foregoing sentence, "windows" is computed to mean entities that are windows, "open windows" is computed to mean window entities that are open), "all the open windows" is computed to mean the set of window entities that are open, "close all the open windows" is computed to mean apply the close function to the set previously computed, "AC" is computed to mean entities that are ACs, "the AC" is computed to mean the one entity that is an AC, "the AC is on" is computed to mean a Boolean describing whether the AC entity is currently on, "if the AC is on, close all the open windows" is computed to mean if the Boolean describing that the AC entity is currently on is true, apply the close function to the set of entities that are windows and are currently open.

Example Method of Operation

Figure 5:
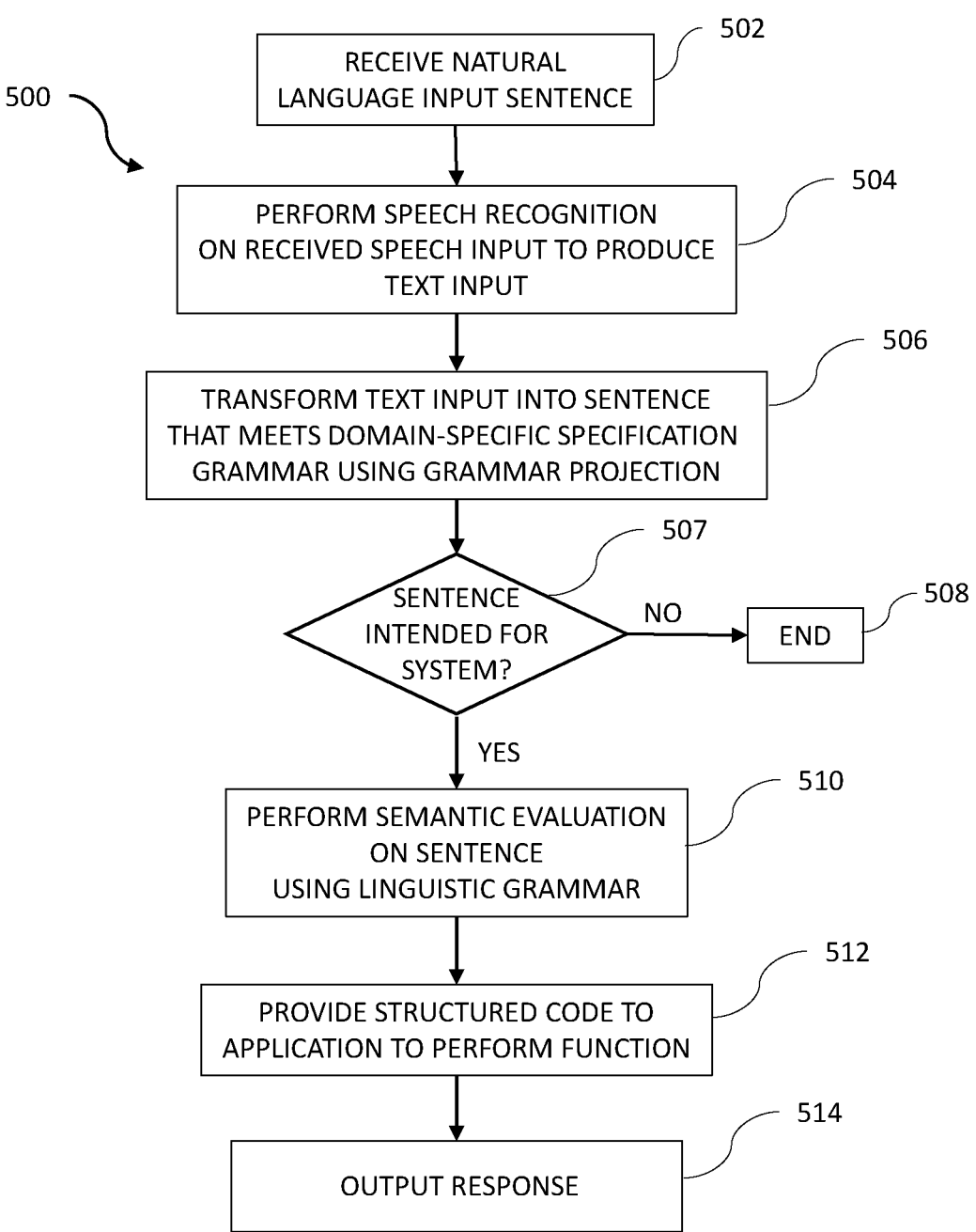
FIG. 5 is a flow diagram illustrating example operations that may be performed by a natural language processing system in accordance with features of embodiments described herein.

FIG. 5 is a flow diagram 500 illustrating example operations that may be performed by a natural language processing system, such as the system 100 (FIG. 1) in accordance with features of embodiments described herein.

In step 502, a natural language input sentence is received by the system. In some embodiments, the natural language input sentence comprises speech input (e.g., a sentence spoken by a human speaker). In other embodiments, the input sentence may comprise text input.

Assuming the natural language input sentence comprises speech input, in step 504, speech recognition is performed on the received speech input to produce text input. If the natural language input sentence comprises text input, execution of step 504 may be omitted.

In step 506, the text input is transformed using grammar projection as described herein into a sentence that meets the domain-specific specification grammar and is as close as possible phonetically to the actual words of the text input.

Figure 6:
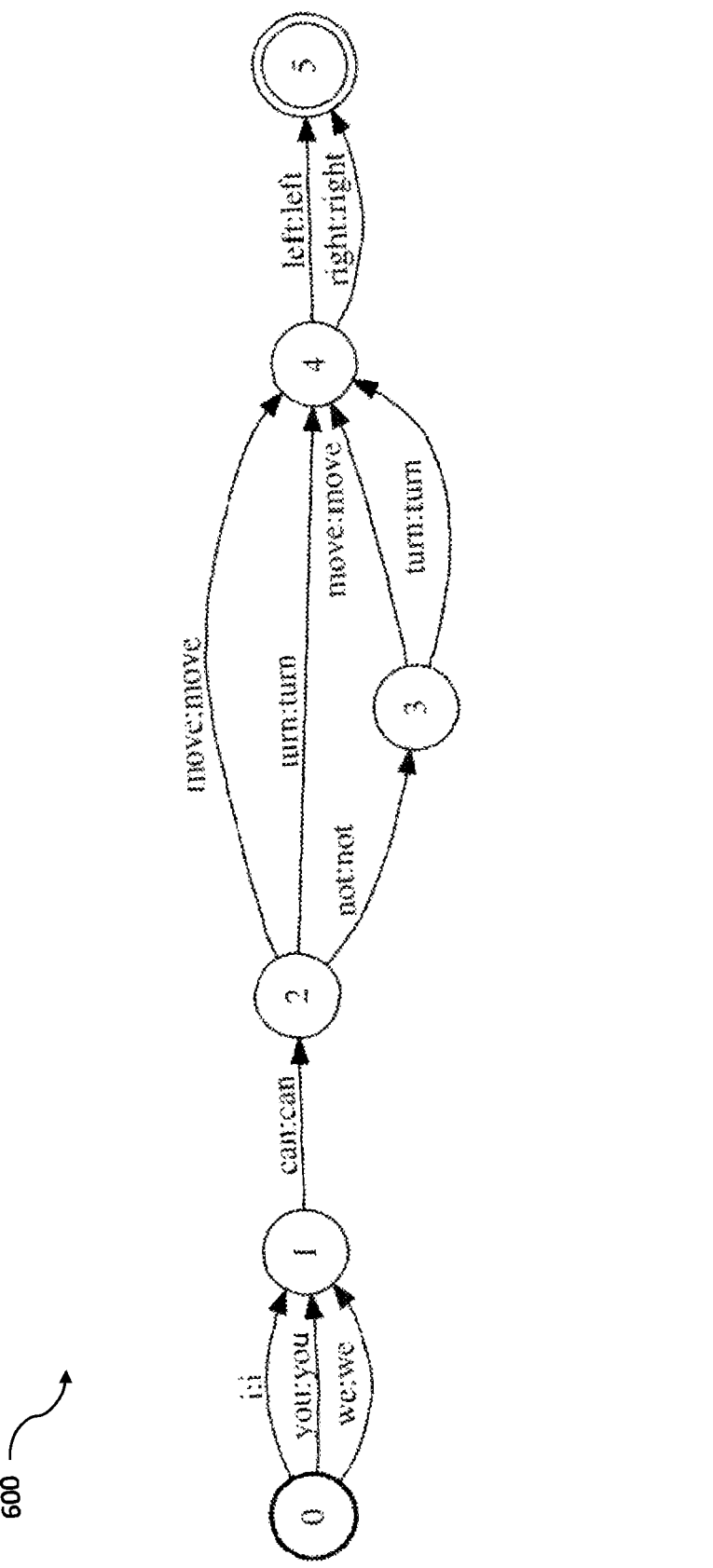
FIG. 6 is a simple automata defining an example language in accordance with features of embodiments described herein.

In step 507, a determination is made whether the sentence was intended for the system. Specifics with regard to one method of execution of step 507 are provided below with reference to FIG. 6. If it is determined that the sentence was not intended for the system, execution terminates in in step 508; otherwise, execution proceeds to step 510.

In step 510, the transformed sentence is parsed into a syntax tree using linguistic grammar and the predefined lexicon. The syntax tree is evaluated using semantic evaluation to determine a meaning of the parsed sentence and associate it with a function.

In step 512, structured code is provided to the application to cause it to perform the identified function. In some embodiments, if the meaning of the parsed sentence cannot be determined in step 510, the structured code may result in a request for additional/clarifying natural language input.

In step 514, a response is output. In certain embodiments, the response may be output in the form of the input received (e.g., speech if the natural language input was speech and text if the natural language input was text); in other embodiments, the output may be in a different form than that of the input received.

Example Grammar Projection Algorithm

The grammar projection algorithm takes as input an arbitrary sentence and finds a similar sounding sentence in a (possibly infinite) set of sentences (defined by a context free grammar). For example, referring to FIG. 6, assuming the "language" is defined by a simple automata 600. In this example, a sentence is accepted if it correctly proceeds from the start node (0) to the final node (5). In one example, the algorithm may output:

ASR output: i cannot moon theft
Projection: i cannot move left
Distance: 0.600

In the above example, the algorithm finds a "projection: that sounds the most similar to the input query (i.e., the ASR output). In doing that, it also computes a "distance," that will be useful for deciding whether the system was targeted or not. The projection algorithm aims to achieve two goals at the same time, including (1) realization of a wakeword-less or keyword-less assistant; and (2) connecting an ASR to a language interpretation system that expects a clean, parseable text input. In order for a voice assistant to not require a wakeword/keyword, it needs to listen to the environment continuously. Whenever it hears something that falls in its expertise (e.g., something about "lowering the windows" in an automotive context), it should conclude that the command was targeting the system. Assuming we don't have access to the search space of the ASR system, this can be realized by using a large vocabulary ASR, and then computing a "phonetic distance" to the domain specific language. If the distance is larger than a distance threshold, then the command is ignored; otherwise, it is forwarded for further processing. Using a distance threshold of 1, the following input will be ignored:

ASR output: close the door
Projection: i can move right
Distance: 2.150

An important difference between text and speech input is that speech may contain unexpected words, repetitions, or the ASR may simply misrecognize words due to differences in pronunciation. Therefore, the output of the ASR may not be parseable by the rest of the system. The projection algorithm effectively "denoises" the ASR output, connecting it to the further language processing of the system 100 that does not rely on a statistical framework, as illustrated by the following examples:

ASR output: we can cannot move left
Projection: we cannot move left
Distance: 0.600
ASR output: you can burn like
Projection: you can turn right
Distance: 0.750
ASR output: you all can turn right
Projection: you can turn right
Distance: 0.500

Example Domain-Specific Implementation of Natural Language Processing System

Figure 7:
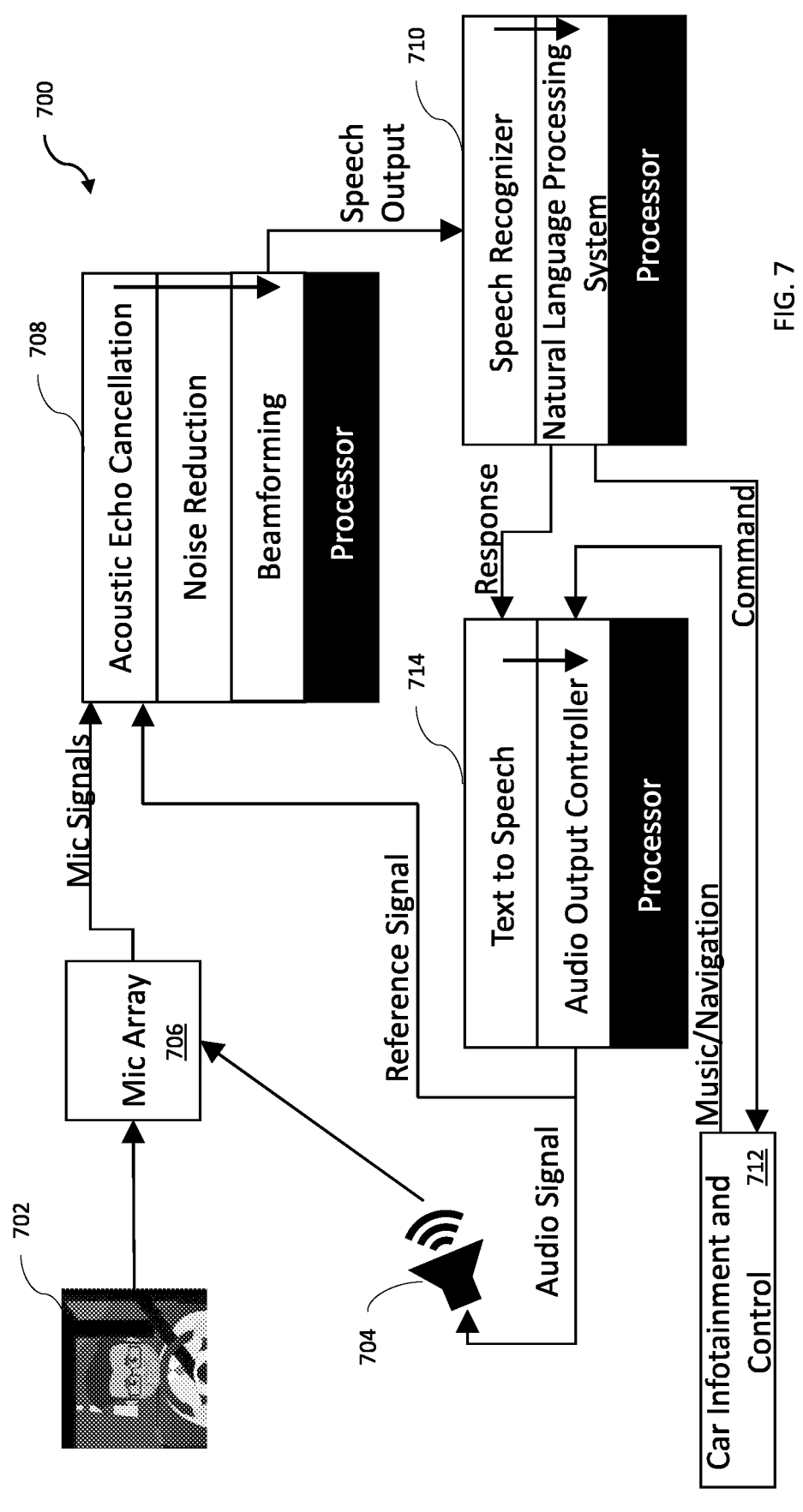
FIG. 7 is an example automotive implementation of a front-end to a natural language processing system in accordance with features of embodiments described herein.

FIG. 7 is a block diagram 700 representing an example implementation of a natural language processing system, including a signal-processing front-end, in an automobile control system domain in accordance with features of embodiments described herein. This signal-processing front end is designed to perform acoustic echo cancellation, noise reduction and/or beam-forming on the audio signal. As shown in FIG. 7, natural language produced either by a human speaker 702 or an automotive speaker 704 is received by a microphone array 706 and input to an audio signal processing system 708. For example, the natural language may be a command spoken by the human speaker 702. Alternatively, the natural language may simply be audio from an infotainment system of the automobile in which the system 700 is installed. The audio signal processing system 708 may perform acoustic echo cancellation (a reference signal may be provided for that purpose), noise reduction, and/or beam forming. Processed audio signals (e.g., speech) output from the audio signal processing system 708 are input to a natural language processing (or spoken language understanding (SLU)) system 710, which may be implemented using some or all of the components of the system 100 (FIG. 1). The SLU system 710 may provide commands to an infotainment and control system 712, which may execute the command. For example, if the natural language input was a request to "turn up the radio volume," the command from the SLU system 710 may cause the infotainment and control system 712 to implement the request. Alternatively, if the natural language input was merely a conversation between two passengers or other speech not meant to be executed by the system 712, the SLU system 710 may merely discard the input as described above without providing a command to the system 712. If more information is required by the system 710 to process the input, a text response may be output from the system 710 to a text-to-speech module and audio output controller 714, which translates the response to an audio signal to be output (e.g., played or broadcast) via the automotive speaker 704.

Example 1 provides a speech processing system, comprising an automatic speech recognition part to receive audio input with speech and output text; a grammar projection part to receive the text and project the text against a domain-specific grammar specification to output corrected text; and an interpreter part to receive the corrected text and evaluate the corrected text.

Example 2 provides the speech processing system of example 1, Further comprising the domain-specific grammar specification including at least one automaton.

Example 3 provides the speech processing system of any of examples 1-2, wherein the at least one automaton comprises a finite state transducer (FST).

Example 4 provides the speech processing system of any of examples 1-3, further comprising the domain-specific grammar specification including at least one context-free grammar data structure based on a set of defined words.

Example 5 provides the speech processing system of any of examples 1-4, further comprising the grammar projection part computing a distance of the text to the corrected text based on one or more automata in the lexicon.

Example 6 provides the speech processing system of example 5, further comprising the grammar projection part determining the corrected text with a smallest distance.

Example 7 provides the speech processing system of any of examples 1-6, further comprising the grammar projection part computing a distance of the text to the corrected text based on one or more automata in the lexicon.

Example 8 provides the speech processing system of any of examples 1-7, further comprising the grammar projection part discarding the text if a projection of the text has a distance that is greater than a predetermined distance threshold.

Example 9 provides a speech processing system, comprising an interpreter part to receive text, parse the text, and evaluates the text; and an application part having a world state; wherein the interpreter part and the application part communicate with each other via an application programming interface.

Example 10 provides the speech processing system of example 9, further comprising the interpreter part sending one or more messages according to the application programming interface to the application part.

Example 11 provides the speech processing system of any of examples 9-10, further comprising the message including a query for information.

Example 12 provides the speech processing system of any of examples 9-10, further comprising the message including a command to perform an action on the world state.

Example 13 provides the speech processing system of any of examples 9-12, further comprising the application part sending one or more responses to the interpreter part.

Example 14 provides a speech processing method comprising receiving audio input from a speaker and transforming the received audio input into text output; projecting the text output against a specification grammar to generate corrected text; and evaluating the corrected text against a linguistic grammar.

Example 15 provides the speech processing method of example 14, wherein the specification grammar includes at least one automata.

Example 16 provides the speech processing method of any of examples 14-15, wherein the lexicon having one or more context-free grammar data structures based on a set of defined words.

Example 17 provides the speech processing method of any of examples 14-16, further comprising the grammar projection part determining the corrected text with a lowest distance.

Example 18 provides the speech processing method of any of examples 14-17, further comprising the grammar projection part computing a distance of the text to the corrected text based on one or more automata in the lexicon.

Example 19 provides the speech processing method of any of examples 14-18, wherein the specification grammar is domain-specific.

Example 20 provides the speech processing method of any of examples 14-19, wherein the linguistic grammar is domain agnostic.

It should be noted that all of the specifications, dimensions, and relationships outlined herein (e.g., the number of elements, operations, steps, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, exemplary embodiments have been described with reference to particular component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system may be consolidated in any suitable manner. Along similar design alternatives, any of the illustrated components, modules, and elements of the FIGURES may be combined in various possible configurations, all of which are clearly within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and may accommodate a large number of components, as well as more complicated/sophisticated arrangements and configurations. Accordingly, the examples provided should not limit the scope or inhibit the broad teachings of the electrical circuits as potentially applied to myriad other architectures.

It should also be noted that in this specification, references to various features (e.g., elements, structures, modules, components, steps, operations, characteristics, etc.) included in "one embodiment", "exemplary embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It should also be noted that the functions related to circuit architectures illustrate only some of the possible circuit architecture functions that may be executed by, or within, systems illustrated in the FIGURES. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Note that all optional features of the device and system described above may also be implemented with respect to the method or process described herein and specifics in the examples may be used anywhere in one or more embodiments.

The 'means for' in these instances (above) may include (but is not limited to) using any suitable component discussed herein, along with any suitable software, circuitry, hub, computer code, logic, algorithms, hardware, controller, interface, link, bus, communication pathway, etc.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and may accommodate a large number of components, as well as more complicated/sophisticated arrangements and configurations. Accordingly, the examples provided should not limit the scope or inhibit the broad teachings of the illustrated topologies as potentially applied to myriad other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A speech processing system, comprising:
one or more modular subsystems comprising one or more processors, the modular subsystems comprising,
an automatic speech recognition module configured to receive audio input with speech and further configured to output text;
a domain-specific lexicon defining a domain-specific vocabulary;
a domain-specific grammar specification defining rules for using the domain-specific vocabulary consistently with a domain agnostic language grammar specification;
a grammar projection module configured to:
receive the text,
generate corrected text by projecting the text against the domain-specific grammar specification, with the projecting including;
generating multiple candidate sentences by applying the text to the domain-specific grammar specification,
determining a phonetic distance between the text and one or more of the multiple candidate sentences,
selecting a particular sentence of the multiple candidate sentences based on the phonetic distance, and
configuring the particular sentence as the corrected text, and
output the corrected text; and
an interpreter module configured to receive the corrected text and evaluate the corrected text.

2. The speech processing system of claim 1, further comprising the domain-specific grammar specification including at least one automaton.

3. The speech processing system of claim 1, wherein the domain-specific grammar specification is implemented as a finite state transducer (FST).

4. The speech processing system of claim 1, further comprising the domain-specific grammar specification including at least one context-free grammar data structure based on a set of defined words.

5. The speech processing system of claim 1, wherein to select the particular sentence, the grammar projection module is further configured to compute multiple phonetic distances from the text to respective ones of the multiple sentences.

6. The speech processing system of claim 5, wherein to compute the multiple phonetic distances the grammar projection module is further configured to compute a first phonetic distance of the multiple phonetic distances based on one or more automata in a lexicon.

7. The speech processing system of claim 5, wherein to select the particular sentence, the grammar projection module is further configured to identify a first sentence of the multiple sentences that has a smallest phonetic distance of the multiple phonetic distances, wherein the first sentence is the selected particular sentence.

8. The speech processing system of claim 7, wherein the grammar projection module is further configured to discard the text in response to the smallest phonetic distance being greater than a threshold phonetic distance.

9. The speech processing system of claim 1, wherein the domain-specific grammar projection module comprises a finite state transducer configured to generate the multiple candidate sentences.

10. The speech processing system of claim 9, wherein the finite state transducer is further configured to determine the phonetic distance.

11. The speech processing system of claim 1, wherein the grammar projection module is implemented in an off-line embedded system.

12. A speech processing method, comprising:
receiving audio input from a speaker by a processing system having a plurality of processors;
transforming the received audio input into text output;
projecting the text output against a domain-specific grammar specification to generate corrected text, with the projecting including;
configuring a finite state transducer to generate multiple candidate sentences by applying the text output to the domain-specific grammar specification, wherein the domain-specific grammar specification defines rules for using a domain-specific lexicon,
determining a phonetic distance between the text output and one or more of the multiple candidate sentences,
selecting a particular sentence of multiple sentences defined by the domain-specific grammar specification based on the phonetic distance and configuring the particular sentence as the corrected text;
evaluating the corrected text against a linguistic grammar to associate the corrected text with a command; and
causing a device to execute the command.

13. The speech processing method of claim 12, wherein the specification grammar includes at least one automata in the domain-specific lexicon.

14. The speech processing method of claim 12, wherein the domain-specific lexicon having includes one or more context-free grammar data structures based on a set of defined words.

15. The speech processing method of claim 12, further comprising determining the corrected text with a lowest phonetic distance.

16. The speech processing method of claim 12, further comprising computing the phonetic distance of the text output to the corrected text based on one or more automata in the domain-specific lexicon.

17. The speech processing method of claim 12, wherein the linguistic grammar is domain agnostic.

* * * * *